Nov. 8, 1966 G. C. DEVOL 3,283,918
COORDINATED CONVEYOR AND PROGRAMMED APPARATUS
Filed Dec. 2, 1963 3 Sheets-Sheet 1
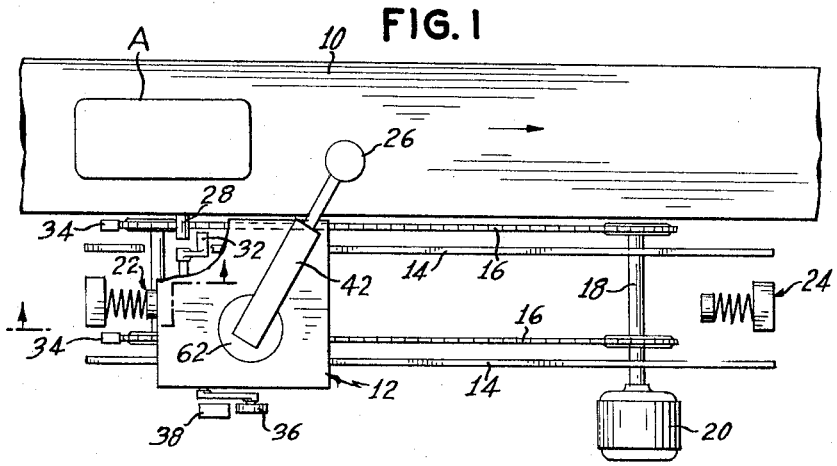
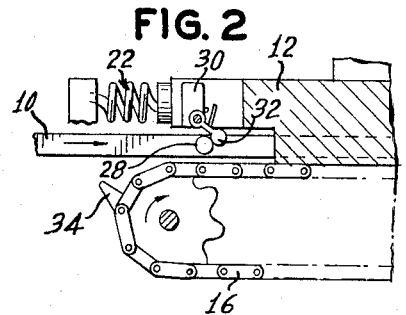
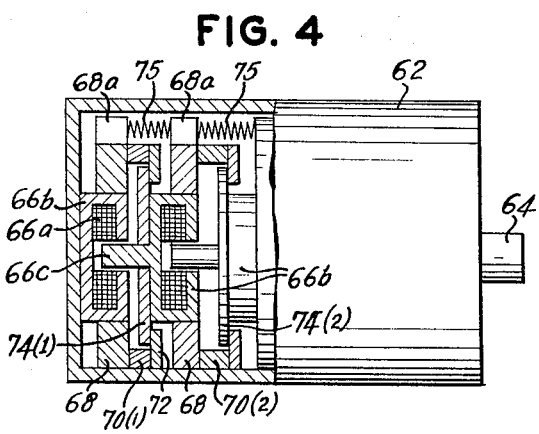
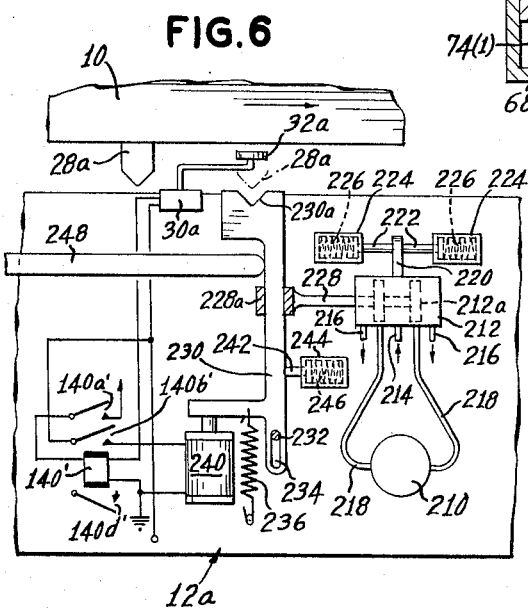
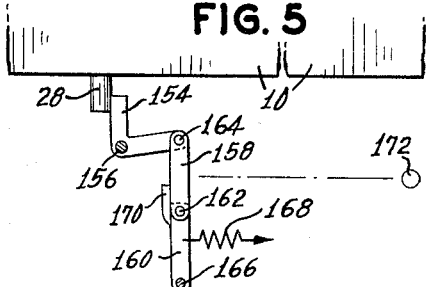
INVENTOR.
George C. Devol
BY
Paul S. Martin
ATTORNEY INVENTOR.
George C. Devol
BY
Paul G. Martin
ATTORNEY

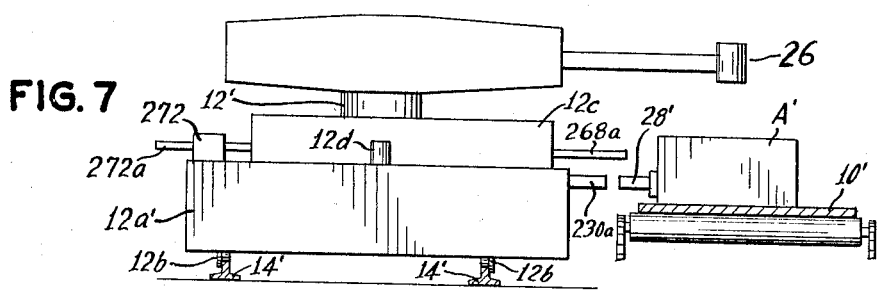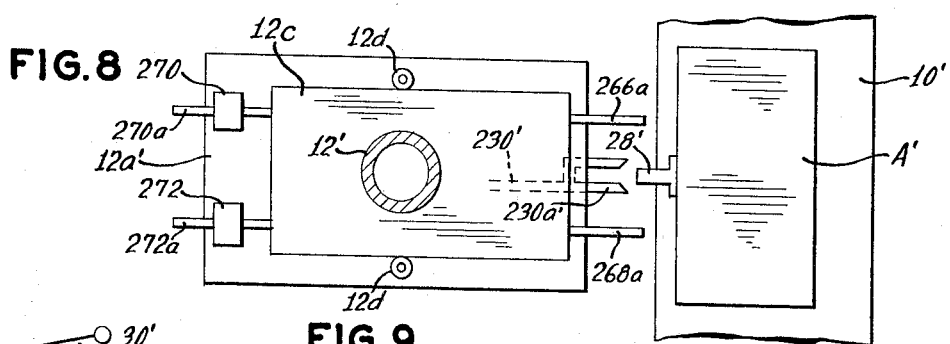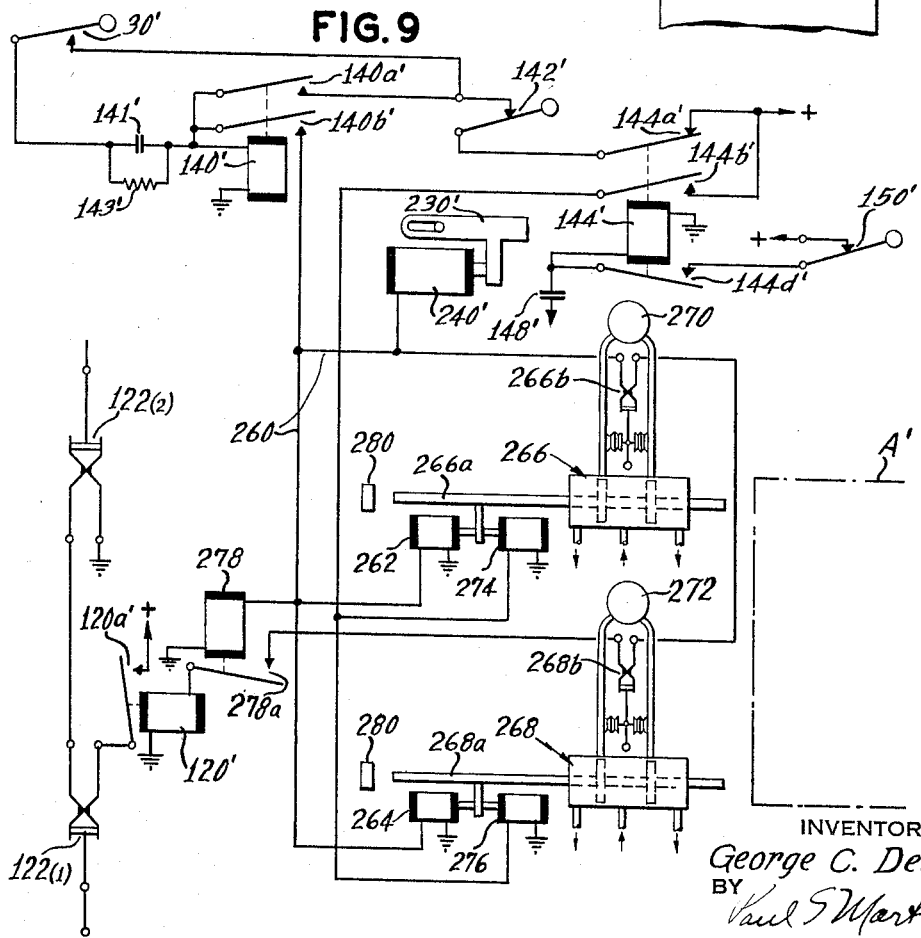

United States Patent Office 3,283,918
Patented Nov. 8, 1966

3,283,918
COORDINATED CONVEYOR AND
PROGRAMMED APPARATUS
George C. Devol, Brookside Drive, Greenwich, Conn.
Filed Dec. 2, 1963, Ser. No. 327,296
27 Claims. (Cl. 214—1)

The present invention relates to programmed apparatus, of the type having flexible controls means that is adapted to receive changed instruction periodically for executing complex sequences of motions and where each new set of instructions produces a new sequence of motions. Apparatus of this kind includes work device which may be an article gripper, and ordinarily has a number of actuators capable of operating the work device in multiple degrees of freedom through a complex pattern of movement under program control. As may be required from time to time, a new program is established for operating the work device through a new pattern of movements.

Programmed apparatus of this character is disclosed, for example, in my application Serial No. 321,644 filed Nov. 5, 1963 entitled "Programmed Apparatus," in my application Serial No. 226,203 filed Sept. 26, 1962 entitled "Programmed Article Handling" and in my Patent No. 2,988,237 issued June 13, 1961 entitled ' 'Programmed Article Transfer." Such apparatus is not only characterized by its capability of carrying out an elaborate sequence of motions, but also by its flexibility in being readily adapted by new program instructions to carry out new assignments.

The programmed apparatus in the present invention may be an article handling unit having a gripper, programmed for loading articles side-by-side in successive rows on a pallet. Conversely, the article handling unit may be programmed to unload the pallet by directing an article gripper to move to one location on the pallet, to grip an article, to deliver it to a receiver, and to move to the next article location on the pallet, repeating the sequence until unloading is complete and resuming the sequence when another pallet of articles is to be processed. The work device may also be a spot-welder and the program may involve coaction of the resistance-welding electrodes with large sheet-metal articles, in applying the electrodes at a series of locations in succession. The sequence is repeated automatically on succeeding articles presented to it. Similarly, the work device may be a paint-sprayer, or an automatic nut-applier moved about by the programmed apparatus to a sequence of threaded studs on an automobile motor block during assembly operations.

An object of the present invention is to adapt such apparatus to coaction with a conveyor such as a belt conveyor or a rotating-disc article carrier or the like. The program of motion of the work device is one that is identified with the work to be performed, but the object on which the work is performed is here carried by a conveyor past the programmed apparatus. A feature of the invention involves the coordinated transport of the programmed apparatus so as to remain in step with the advancing object carried by the conveyor and the synchronization of program initiation with each new object presented by the conveyor. The programmed apparatus moves bodily along with the conveyor as the program is carried out. At the completion of each program, the programmed apparatus is transported in the opposite direction to a starting position and the program is restored to its start, in preparation for a renewed cycle of operations on the next object advanced by the conveyor into range of the programmed apparatus. In this aspect of the invention, drive means in different forms is provided and is equipped with coordinating control means for moving the programmed apparatus in step with the carrier of conveyor. As a further feature, coordinated drive means is additionally provided for shifting the programmed apparatus laterally into predetermined position relative to each new object carried by the conveyor and maintaining that relative position during the program sequence. At the completion of the program, the programmed apparatus is withdrawn laterally, as it is also driven in reverse along the conveyor to a starting position.

Further objects of the invention relate to features of program control, and to devices for effecting strokes or motions of an actuator under combinational-record program control with a high degree of accuracy but without resort to excessively costly code-conversion or translating mechanism. In a novel feature of program control, the present invention provides a control record that is in condition to be sensed during the time that a previously sensed instruction is being carried out; momentarily the new instruction is consulted and stored; and the control record advances into position to provide the subsequent instruction while the stored instruction is being carried out.

The novel converting means that responds to the combinational-code control, in accomplishing a detailed object of the invention, includes a column of devices each of which can be extended or it can contract, selectively. The displacement of each device in the column is determined by the difference in thickness of a thin element and a thick element that are laterally opposite one another where both the thin and the thick elements are confined between parallel surfaces: the clearance provided by the thickness difference determines the stroke of the device, between its contracted and its extended positions. The cumulative effect of the stack of selectively contracted or extended devices provides the mechanical control output in response to the combinational code input.

The foregoing and other objects and novel features of the invention will be appreciated from the following detailed description of various embodiments shown in the accompanying drawings that form part of this disclosure.

In the drawings:

FIGURE 1 is a plan view in diagrammatic form of a presently preferred embodiment of the invention;

FIGURE 2 is an enlarged elevation, partly in cross-section, of a portion of the embodiment of FIG. 1;

FIGURE 4 is a lateral view of an element in FIG. 3 shown partly in cross-section and drawn to larger scale;

FIGURE 5 is the plan view of a modified portion of the embodiment in FIGS. 1–3, inclusive; and FIGURE 6 is a further modification of a portion of the embodiment of FIGS. 1–3;

Figure 3:
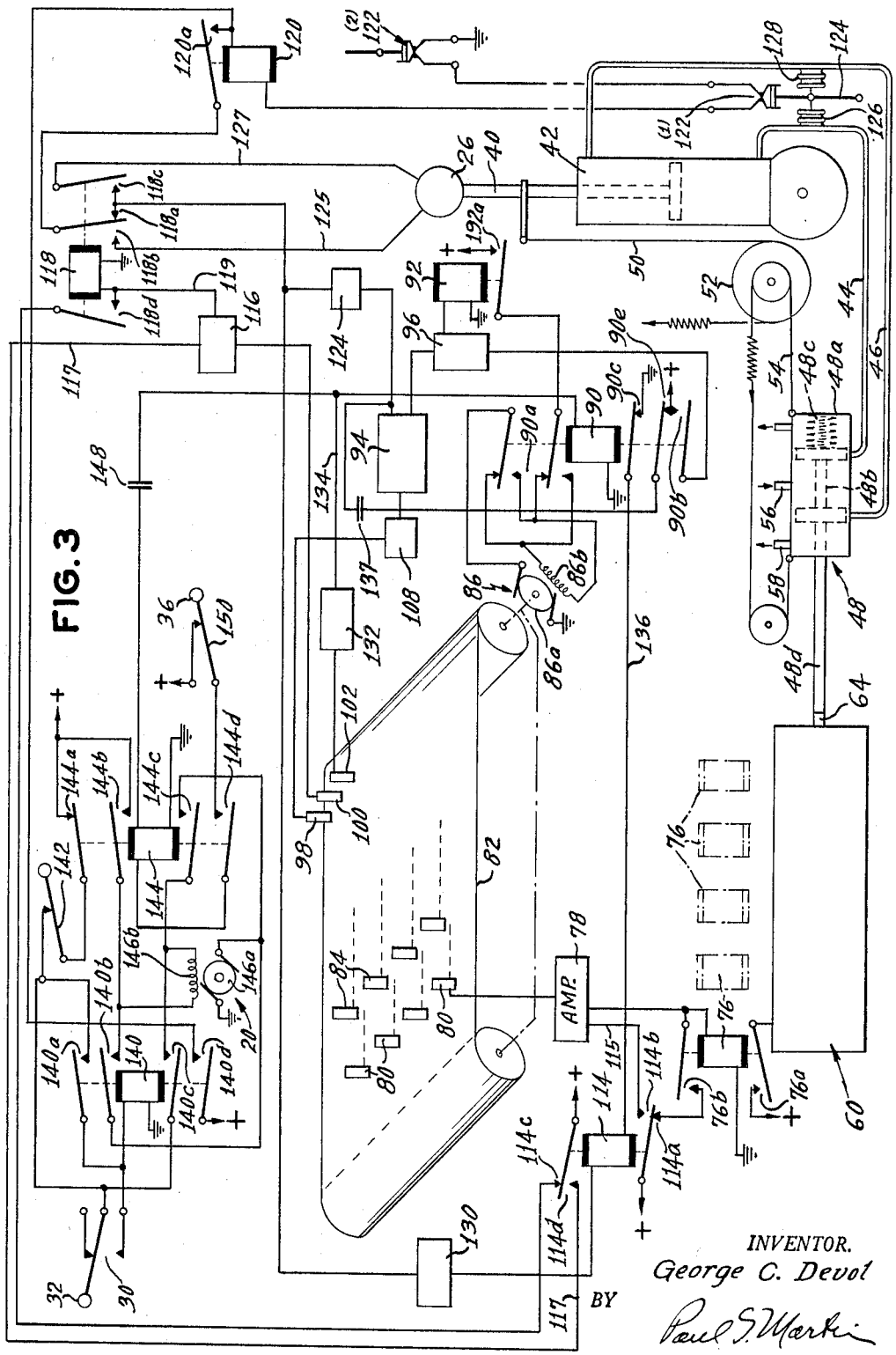
FIGURE 3 is a wiring diagram of the embodiment in FIG. 1.

FIGURES 7–9 relate to a further embodiment of the invention, utilizing the control modification of FIG. 6 in the apparatus of FIGS. 1–4, and in this embodiment:

FIGURE 7 is a transverse elevation, partly in cross-section, of the coordinated apparatus;

FIGURE 8 is a plan view of the embodiment in FIG. 7; and

FIGURE 9 is a wiring diagram of so much of this embodiment that differs from the control apparatus in FIG. 3.

Referring now to the drawings and particularly to FIGURES 1 and 2, a main conveyor 10 is shown adjacent to a programmed work device 12, the latter being supported by wheels (not shown) that ride along track 14. A pair of chains 16 are looped about respective pairs of sprockets, one pair of sprockets being driven by shaft 18 and motor 20. The base of apparatus 12 is secured to chains 16 so as to move with those chains. Motor 20 operates first in one direction and then in the opposite direction for propelling unit 12 first to the right and then to the left, alternately along and opposite to the direction of travel of conveyor 10. In this illustration, conveyor 10 is assumed to move from left to right as indicated by the arrow, and at a substantially constant speed. At the left-hand limit of the travel of unit 12, there is a spring bumper 22, and at the right-hand end of the travel of unit 12, there is another spring bumper 24.

As illustrated in FIGURE 1, a workpiece A is disposed on conveyor 10. The working end 26 of the apparatus 12 is programmed to cooperate with successive portions of workpiece A. The conveyor 10 has a rod 28 that projects laterally from it, for cooperating with apparatus 12 in achieving synchronized left-to-right travel of apparatus 12. By virtue of this synchronism, an established program of operation of work unit 26 can be carried out. This program of operation is commenced when apparatus 12 is in its left-hand extreme position and the program of operation is completed before the apparatus reaches its right-hand extreme position. For example, the workpiece A may be a cylinder block of an automobile engine from which there projects a number of threaded studs, and work unit 26 may be an automatic tool for applying nuts to the studs projecting from block A, in rapid automatic sequence. In another subsequent application of the same programmed apparatus, work unit 26 may be a paint-sprayer, and later it may be an article gripper in still another use of the same physical apparatus.

As seen in FIGURES 1 and 2, apparatus 12 is secured to chain 16 and has mounted thereon a switch 30 whose operating lever 32 is disposed in the path of bar 28 of conveyor 10. Further, chain 16 includes a pusher member 34. With the parts as illustrated in FIGURE 2, at the start of a program of operations, pusher member 34 is below the path of travel of bar 28, and switch-actuating arm 32 is in the path of bar 28.

When the apparatus is in operation, bar 28 on conveyor 10 advances against switch lever 32 and operates switch 30. This starts the programmed operation of apparatus 12, and this also starts a coordinated forward motion and automatc return motion of apparatus 12. After switch 30 is operated, there is a time interval during which motor 20 operates chains 16 and propels unit 12 forward with the conveyor, to the right as viewed in FIGURE 1. Subsequently, the motor is reversed and unit 12 is transported toward the left by driven chains 16. During the forward travel, the work unit 26 is put through a programmed sequence of operations on article A. The program is just the same as if both the article and the base of the programmed apparatus were stationary.

Pusher member 34 projects from chain 16 sufficiently so that, when chain 16 once commences to advance, pusher member 34 can catch up with bar 28 of conveyor 10. After pusher member 34 engages bar 28, the drive motor 20 is slowed down by bar 28 and the motor is effective to keep pusher member 34 pressed firmly against bar 28. As a result, apparatus 12 moves in strict synchronism with belt 10 and at a very accurately determined position relative to the workpiece A. Presumably the workpiece remains accurately located relative to conveyor 10. Another switch lever 36 carried by apparatus 12 cooperates with a stationary stop 38 at the completion of the leftward movement of apparatus 12. A similar switch member 142 (FIGURE 3) cooperates with a corresponding stop at the right-hand limit of the travel of unit 12 as a safety stop for insuring interruption of the forward travel.

Referring now to FIGURE 3, it will be seen that the work unit 26 is carried by a radially extendable arm that includes shaft 40 and hydraulic actuator 42. Hydraulic lines 44 and 46 extend to actuator 42 from master valve 48. This valve includes a spool 48b within body 48a, spool 48b being biased to the left by spring 48c and having a shaft 48d extending therefrom.

A spring-tensioned cable 50 extends from shaft 40 around a large-diameter portion of a pulley 52 and another spring-tensioned cable 54 extends around a small-diameter portion of pulley 52 to valve body 48a. Hydraulic fluid under pressure is admitted to valve 48 at its center by line 56 and low-pressure return fluid is delivered from the ends of body 48a by dump lines 58. When spool 48b is centered, it delivers either no fluid or fluid under balanced pressure (depending upon the design of the valve) to lines 44 and 46. When spool 48b is displaced to the left or to the right relative to body 48a, then hydraulic fluid under pressure travels from line 56 to one of the lines 44 and 46 and fluid is returned from actuator 42 via the other line 44 or 46 through the master valve to one of the dump lines 58. The pressure differential developed in actuator 42 causes displacement of shaft 40; and as this takes place, pulley 52 is rotated by cable 50; and, in turn, pulley 52 operates cable 54 to displace body 48a. In some discrete time interval, operation of actuator 42 displaces valve body 48a until the body is centered relative to the spool 48b. Shaft 40 then has reached a position corresponding to the set position of spool 48b.

Shaft 48d is adjustably positioned by a digital setting device 60, under program control. As a practical matter (although not in any way critical) pulley 52, master valve 48, and digital setting means 60 are all carried by actuator 42, valve body 48 having a suitable slide mounting. By the foregoing control means, the position of work unit 28, radially of program-controlled apparatus 12 (FIGURE 1) can be varied to successively different radial positions, this representing one degree of freedom of which the apparatus is capable. A rotational actuator 62 (FIGURE 1) is provided with like programmed-controlled actuating means for causing arm 42 to sweep about a vertical axis, and other programmed degrees of freedom as required are included in apparatus 12, as for lifting and lowering arm 42 and thereby adjusting the vertical position of work unit 26. Correspondingly, program controlled mechanism for providing a twist of motion of shaft 44 and for providing a "wrist" bend of the work head 26 are not specifically illustrated although they are contemplated parts of the programmed apparatus that may be used in practicing the invention, in accordance with the particular circumstances to which the invention is applied.

Digital control device 60 is shown in detail in FIGURE 4. This device includes an outside casing or support 62 which is nominally stationary and an output shaft 64 that is projected to varying degrees depending upon the digital information that is supplied. Inside case 62 there are a number of electromagnets each having a winding 66a, a core or pole structure 66b, and an armature 66c. Each of these electromagnets has three rings associated with it, namely, rings 68, 70 and 72, and a disc 74. Rings 68, 70 and 72 are fixed to each other and, in turn, fixed to core 66b. Disc 74 is fixed to the core 66b of the next succeeding electromagnet in casing 62. All of the discs 74 are of identical thickness, ground to a close tolerance. The surfaces of rings 68, 70 and 72 which confront each other and which confront disc 74 are also ground flat, accurately. All of the discs 74 are of identical thickness, 0.100 inch, for example. Rings 70 are of progressively increasing thickness. Ring 70(1) associated with the first electromagnet 66 is 0.1005 inch and ring 70(2) associated with the second electromagnet is 0.1010 inch thick. Disc 74(1) has a clearance of 0.005 inch between its rings 68 and 72, disc 74(2) is in a space between its rings 68 and 72 of 0.0010 inch, and so forth. Each disc 74 is in a clearance space established by the associated ring 70. Each ring 70 of the series establishes twice the clearance space of the disc and ring that precedes it in the series. The successive rings 68 have lateral extensions at a number of peripheral points (only one such extension 68a being shown for the first two electromagnets) and springs 75 are provided for biasing the successive discs 68 away from each other.

The various electromagnets and rings described are slidably received in case 62. Springs 75 bias rings 68 away from each other and thus act to extend the column of electromagnets and to push shaft 64 outward to the right, to its maximum extent. Each electromagnet, when energized, draws its armature 66c inward and pulls its associated disc 74 against its ring 68, thereby compressing its associated spring 75. In the examples of the dimensions given above, when the first electromagnet is energized, its disc 74(1) moves to the left 0.0005 inch. It carries the second electromagnet bodily with it and it also carries all other in the column bodily, deflecting shaft 64 to the same extent, to the left. When the second electromagnet 66 is energized, its disc 74 moves 0.0010 inch to the left. The third electromagnet when energized moves its disc 0.0020 inch to the left, and so forth, each successive electromagnet producing twice the deflection of the previous one. Further, the dimensional displacement produced by each electromagnet is added to those of all the other electromagnets and the cumulative displacement of all of the electromagnets is represented by a shift of rod 64 to the left. Accordingly, rod 64 is retracted to an extent that corresponds to the particular combination of electromagnets energized.

The construction described is readily manufactured and duplicated with a high order of accuracy, but is nonetheless relatively inexpensive to produce. Since the thickness of each disc 74 is the same as that of all the others, these can readily be duplicated. The stroke of each disc 74 is accurately determined by the thickness of its associated ring 70 which, like ring 74, is relatively easy to manufacture to the required dimension. As a result, the displacement of rod 64 is achieved with a high order of accuracy and to an extent that depends upon the combination of the displacements of the respective energized and nonenergized electromagnets in the stack of electromagnets associated with rod 64.

Returning now to FIGURE 3, it will be seen that the respective electromagnets within digital displacement unit 60 are energized by relays 76 via relay contact 76a, there being one relay 76 for each electromagnet 66 in casing 62. For each relay 76 there is an amplifier 78 and a sensing element 80 that cooperates with a magnetic program record 82. Where record 82 is a magnetic band that is advanced stepwise, sensing elements 80 are of the "at-rest" sensing type such as those disclosed in my Patent No. 2,988,237 issued June 13, 1961 and Patent No. 2,926,844 issued March 1, 1960. For present purposes, sensing elements 80 may also be considered as being photoelectric cells or electro-mechanical contacts or brushes where record 80 is a perforated tape. Depending upon the combination of magnetized spots or perforations opposite the respective sensing elements 80, the various electromagnets in digital control device 60 will cause rod 64 to project at various extents.

One control device 60 and one group of sensing elements 80 is provided for each degree of freedom so that sensing elements 80 control the radial-motion degree of freedom with motion provided by actuator 42; a second set of sensing elements 84 controls motion of a second degree of freedom of programmed device 12 such as for operation of actuator 61, and as many groups of sensing elements 80, 84, etc. are provided as there are controlled degrees of freedom in programmed device 12.

Record belt 82 is advanced in a step-by-step fashion, for disposing one row of control areas at a time opposite sensing elements 80, this being effective, for any one position of belt 82, to dispose corresponding rows of control areas opposite the group of sensing elements 84; and in any given position of belt 82 there will be other rows of control areas opposite all other groups of sensing elements that are provided for controlling other degrees of freedom of apparatus 12. For the purpose of advancing belt 82 step-by-step, and for rewinding belt 82 so as start a new program, the following control apparatus is provided.

Electric motor 86 having an armature 86a and a field winding 86b has terminal connections to relay contacts 90a of relay 90, contacts 90a being effective to connect motor 86 for forward drive in the illustrated position of contacts 90a, or to reverse the direction of rotation of motor 86 when relay 90 is energized. Relay 92 has a pair of normally open contacts 92a connected to contacts 90a. Relay 92, when energized, closes its contacts 92a for connecting power to motor 86 through relay contacts 90a. Relay 92 is energized for brief intervals in its forward step-by-step mode of motor control by "flip-flop" or bistable circuit 94. Flip-flop 94 is connected to relay 92 through isolating circuit 96. Alternatively, when relay 90 is energized in effecting a reverse-drive or rewind operation of motor 86, relay contacts 90b provide sustained control input to isolating circuit 96 for energizing relay 92. When control input is provided from circuit 94 or from contacts 90b to isolating circuit 96, relay 92 is energized; and motor 86 is effective to advance record 82 or to rewind belt or record 82, depending on whether relay 90 is energized.

In addition to the groups of sensing elements 80 and 84, and any additional groups of sensing elements provided, three more sensing elements 98, 100 and 102 are included in this apparatus. Naturally additional sensing elements may also be used, as required. Sensing element 98 is disposed opposite a longitudinal track of belt 82 at which there is a series of regularly spaced control areas. Such areas may be a regularly spaced sequence of holes in the case of a perforated tape, where sensing element 98 is either a photocell or like sensing element, or magnetized spots on a magnetic band 82 may be sensed by appropriate magnetic sensing heads. Sensing element 98 is connected by way of amplifier and pulse generator 108 to flip-flop 94 and is effective to set the flip-flop in its condition in which it stops motor 86 by deenergizing relay 92. When sensing element 98 senses a control area and the belt stops, all of the other sensing elements 80, 84 and 100 are opposite their respective control areas.

The condition of flip-flop 94 is reversed for enabling the next one-step advance of the belt 82 by the following apparatus. "Function" sensing element 100 is coupled by amplifier 116 via line 119 to relay 118 which has normally closed contacts 118a and normally open contacts 118b, 118c and 118d. Amplifier 116 has a control connection 117 via contacts 114d (when closed) to a source of operating potential. Normally, however, contacts 114d are open and contacts 114c are closed. The latter are connected in series with holding contacts 118d of relay 118.

When the belt 82 is at rest and sensing element 100 is opposite a control area, and before the belt is advanced to bring another control area under a sensing element 100, relay 114 is momentarily energized, as will be described. Amplifier 116 is energized, momentarily, by closing of contacts 114a. If there is a control area under sensing element 100 that calls for a "function" to be accomplished, then relay 118 is energized and its holding contacts 118d are closed. Relay 118 is designed so that it drops open only after a short delay. When relay 114 is no longer energized, contacts 114a open (disabling amplifier 116) and contacts 114c close so as to complete a holding circuit through contacts 114c and 118d, maintaining relay 118 energized.

It may be assumed that relay 118 was not energized, for lack of a function-control recording in the area opposite sensing element 100, and consequently contacts 118a are closed. A circuit is established for providing start-impulse generating unit 124 with an input pulse, this circuit including normally closed contacts 118a and contacts 120a of relay 120, to a source of operating potential. Relay 120 is connected in series with a number of actuator-controlled switches 122(1), 122(2), etc., there being as many such switches 122 as there are programmed degrees of freedom in apparatus 12. Each switch 122 includes a mechanical part 124 that is movable from its normal centered position by balanced pressure diaphragms 126 and 128 connected to the respective supply lines 44 and 46 of actuator 42. Contacts 122(1) are closed when the pressures in lines 44 and 46 are alike or when there is no pressure in these lines. When there is unbalanced pressure in lines 44 and 46 so that actuator 42 is operating its output mechanical elements under program control, then either of the contacts of switching device 122 is deflected out of engagement with the other. It follows accordingly that when all of the switches 122 are closed, indicating that all of the actuators under program control have arrived at their intended positions dictated by the program control that is provided, relay 120 is energized. Contacts 120a and 118a being closed at this time, circuit 124 provides a "start" impulse to flip-flop 94, resulting in energization of relay 92 and advance-stepping operation of motor 86. Advance-operation of motor 86 continues until the next impulse is developed at sensing element 98 and circuit 108 reverses flip-flop 94, to deenergize relay 92.

As an alternative mode of operation to the foregoing, sensing element 100 at times provides a function-control impulse during a typical program of apparatus 12, and (assuming relay contacts 114a are closed momentarily) amplifier 116 then causes relay 118 to be energized, as previously indicated. When this occurs, contacts 118a are opened and contacts 118b, 118c and 118d are closed. At the conclusion of the program-controlled operations of the various actuators 42, etc., the switches 122 are all closed and relay 120 is energized as previously described. Contacts 120a in series with contacts 118b provide a starting impulse for work unit 26. An impulse supplied via lead 125 to work unit 26 starts the normal cycle of this work unit, which may be a welder, a nut-assembler carrying a supply of nuts to be assembled to threaded studs on workpiece A, or it may be a drill or a tap or other form of tool. Whatever its form, either by its internal construction or by means of a collaterally started self-timer, it emits a signal at wire 127 at the end of its internal cycle. Contacts 118c connected to wire 127 being closed at this time, unit 26 supplies the necessary impulse to the input of circuit 124 to initiate a forward feeding step of belt 82. Unit 26 repeats its cycle only in response to another impulse, provided when contacts 120a open and close in a subsequent program step.

Reverting now to sensing elements 80, amplifiers 78 and relays 76, it will be observed that relay 114 is provided, having a normally closed pair of contacts 114a between a source of operating potential and the holding contacts 76b of relay 76. Additionally relay contacts 114b are provided which are normally open and are connected via line 115 to amplifier 78 and others like it, providing an enabling potential to be connected to those amplifiers. During the time that relay contacts 114a are closed, relay 76 will be energized if its holding contacts 76b were previously closed but otherwise relay 76 will be deenergized. When relay 114 is energized momentarily, contacts 114b close briefly and amplifier 78 is energized for transmitting the control condition from each sensing element 80 via its amplifier 78 to the corresponding relay 76. Assuming that the particular control area sensed by element 80 calls for relay 76 to be energized, relay contacts 76b close. Upon deenergization of relay 114 a moment later, contacts 114b open and contacts 114a close. The characteristic of relay 76 is such that contacts 76b remain closed during the switching of relay contacts 114a and 114b, so that relay contacts 76b remain closed under the operating conditions just discussed. Thereupon, a holding circuit is established from the operating power supply through relay contacts 114a and holding contacts 76b for maintaining relay 76 energized.

It will be recalled that there is signal input to pulsing circuit 124 from relay contacts 118a or 118c (as the case may be) which occurs at the completion of the last program instructions stored in relays 118 and 76. This impulse is supplied via pulse generating circuit 130 to relay 114, for energizing that relay momentarily. During the brief energization of relay 114, new instructions as to function and as to position in the various degrees of freedom are entered into relays 118 and 76. Circuit 124, which provides flip-flop 94 with a motor starting impulse, may have a slight delay in its characteristic so that entry of the program instructions into relays 76 and 118 can be effected before belt 82 advances appreciably. Such delay characteristic may be omitted if the control areas sensed by sensing head 98 are correspondingly adjusted or staggered along the belt, to the extent that may be necessary for sensing element 100 and sensing elements 80, 84, etc., to coact with their respective control areas, at the start of a step-advancing cycle of belt 82. It should be understood that this detail of timing, and indeed the form of sensing elements and program control element 82 as well as its drive are illustrative, as other known program-controlling apparatus can be substituted. The program-controlling apparatus should have large capacity for many motions as may be required, in the general-purpose application that is contemplated for the apparatus, and the control element 82 should be of a form that can be readily re-recorded or replaced with newly recorded control information, in "teaching" the apparatus each new program of operations.

At the end of the program recorded on belt 82, it becomes necessary to reverse-feed the belt to its starting position. For this purpose, sensing element 102 is provided. Along a corresponding longitudinal control track, belt 82 contains a control area dictating start of the reverse-feed function of the control belt itself. For the purpose of ending the reverse-feed operation, belt 82 also has a "home" control area along the same sensing track that is sensed by element 102. Of course, separate sensing elements 102 at separate tracks (width-wise of belt 82) could be employed for sensing the end-of-program position and the start-of-program position on belt 82. In the form illustrated, sensing element 102 is connected to a bistable circuit 132 that switches back and forth in response to successive input pulses. During the forward-feed of belt 82, output lead 134 of bistable circuit 132 is substantially at ground potential so that relay 90 is not energized. When sensing element 102 detects an end-of-program control area, bistable device 132 reverses its condition and energizes the relay 90 and reverses the motor-control contacts 90a. At the same time, relay contacts 90b close and relay 92 is energized. As a result, belt-feed motor 86 is started in operation, in the reverse-feeding direction. This reverse belt-feeding operation continues until sensing element 102 again detects a control area at the "home" position in the program. At that time, the condition of bistable circuit 132 is reversed so that relay 90 is deenergized and motor 86 stops. Suitable braking means may also be provided, as is well known, for arresting belt 82 promptly at its "home" position.

Relay contacts 90c which are closed during the forward-feed operation of motor 86 (when relay 90 is deenergized) are connected via wire 136 to relay 114. During reverse-feeding operation, contacts 90c are open and all sensing by elements 80, 84 and 100 is suppressed. The stored states of relays 76 are thus preserved, and actuator 42 (as well as the actuators in the other degrees of freedom) hold their last-established positions during the return-operation of the program belt 82.

During the reverse-feed operation, sensing element 98 repeatedly sends signals to flip-flop 94, so that the flip-flop remains set in its motor-stopping condition. However, relay 92 is energized via isolating circuit 96 so long as contacts 90c remain closed. In due course, relay 90 is deenergized when belt 82 reaches its "home" position. Relay contacts 90e close and transmit a pulse via capacitor 137 to the motor-actuating input connection of flip-flop 94. Relay contacts 90a are in their forward-operating position and relay 92 is energized. Forward feeding of belt 82 commences automatically, and continues only briefly until sensing element 98 detects the first control position of the program and provides a stop impulse for unit 94. This arrangement enables high-speed rewind of belt 82 and takes into account some overtravel by promoting accurate positioning of belt 82 in the initial control position of the program.

A new program cycle is initiated by closing of relay contacts 140d (described below) causing the sensing of the first control position of the program by sensing elements 80, 84 and 100.

Relay 140 is connected to a source of energizing potential via contacts 30, normally closed limit-switch contacts 142 and normally closed contacts 144a of a relay 144. It will be recalled that these contacts are closed by bar 28 carried by conveyor 10. Upon momentary energization of relay 140, its contacts 140a establish its own holding circuit via limit-switch contacts 142 and relay contacts 144a to the source of potential.

So long as relay 140 is energized, its contacts 140c connect one end of field winding 146b of a reversible motor 146 to an electric power supply, and relay contacts 140b connect the opposite terminal of winding 146b to the rotor 146a of motor 20. Motor 20 is thus energized and starts to drive chain 16 in the direction to propel the base of apparatus 12 along with the conveyor. The motor speed is fast enough so that apparatus 12 speeds up and moves faster than the conveyor initially. When pusher 34 on chain 16 reaches bar 28 of the main conveyor, motor 20 is retarded and thereafter apparatus 12 moves in exact synchronism with the conveyor 10. This condition is established quickly, at the start of the forward travel of apparatus 12.

Before bar 28 operates switch 32, program belt 82 is in its first control position and in readiness for a new operating program. Switch 30 causes relay 140 to close its normally open contacts 140d in series with contacts 120a and thereby to start programmed operation. Relay 114 is energized briefly to effect a sensing operation. Relays 76 and 118 then store the sensed program data. The various actuators 42, 61, etc. start to move to the positions dictated by relays 76, etc. Belt 82 at the same time advances to its next control position. The programmed sequence continues, causing work unit 26 to move to successive programmed positions relative to work piece A, and during the entire programmed sequence motor 20 drives apparatus 12 precisely in step with work piece A.

At the end of the program, the drive of motor 20 is reversed and apparatus 12 is returned to its starting position, in readiness to respond to the next bar 28 of conveyor 10. An end-of-program impulse from bistable circuit 132 is coupled by lead 134 through capacitor 148 to relay 144. This provides momentary energization of the relay. Relay contacts 144a open, and normally open relay contacts 144b, 144c and 144d close. Closing of holding contacts 144d establishes a holding circuit to relay 144 from an electric power supply via normally closed contacts 150 of a limit switch. Contacts 144b and 140c establish a circuit for operating motor 20 in the return direction. Motor 20 operates a high speed to restore the apparatus to the condition in FIGURES 1 and 2. Of course, the forward-drive switch connections 140b and 140c are broken as a result of opening of relay contacts 144a. The return-drive operation of motor 20 is terminated when limit switch 150 is opened, as a result of the coaction of switch operator 36 with stationary cam 38 (FIGURE 1).

Switch 142 in series with relay 140 is a safety provision, to terminate forward-drive operation of motor 20 after the maximum permissible travel of apparatus 12 along the conveyor. The operating lever of switch 142 carried by apparatus 12 coacts with a companion stationary cam (not shown) near the right-hand limit of travel of apparatus 12.

It is contemplated that suitable provision can be made to control the return-travel speed of apparatus 12. Motor 20 is not retarded by engagement of pusher 34 with bar 28 during the return-travel operation of apparatus 12, and so motor 20 effects rapid return of apparatus 12 to its starting location. An electrical or gear-change speed-control may be provided for effecting higher-speed return of apparatus 12, to be operated by relay 144.

The operation of the apparatus in FIGURES 1-3 may now be reviewed briefly. Conveyor 10 carries a series of articles A at locations on the conveyor that are accurately preestablished in relation to a series of bars 28 spaced apart along the conveyor. When a bar 28 strikes lever 32 and operates switch 30, relay 140 is energized. The relay establishes its own holding circuit and it remains energized while apparatus 12 is transported right-to-left in FIGURE 1 along the conveyor. The apparatus moves in fixed synchronism with the conveyor and performs the programmed sequence of motions and work operations dictated by its program control belt 82. As soon as relay 140 is energized, its contacts 140b and 140c connect direct-current series motor 20 (146a, 146b) for operation in the direction to operate chain 16 and to advance apparatus 12 along the conveyor 10. The motor quickly accelerates apparatus 12 to a higher speed than conveyor 10, so that element 34 on the chain 16 advances against the back surface of bar 28. Thereafter motor 20 is retarded by the conveyor 10, element 34 continuing its push against bar 28. Apparatus 12 thereafter remains in a fixed position relative to conveyor 10 and to article A.

At the start of the entire program, all the actuators 42, etc. for the various degrees of freedom in the apparatus 12 are at rest in the positions dictated by their code-to-position converters 60 under self-holding relays 76, so that switches 122(1), 122(2), etc. are closed. It may be considered that the final program step of the program involves a motion of arm 42 away from the path of the advancing articles A on the conveyor, and that relay 118 is deenergized. Accordingly, when relay 140 is energized, relay 120 is energized by contacts 140d and contacts 120a close. This applies a pulse to unit 130 for effecting a sensing operation by elements 80, 84 and 100, and it also applies a pulse to unit 124 to start a forward step-drive of motor 86 and belt 82. Initially the programmed instruction that is sensed is stored in relays 76 and 118, and the step-advance of belt 82 brings the next program instruction into position for sensing. The programmed motions of apparatus 12 and its work unit 26 operate in relation to article A just as if both the apparatus and the article were both at rest. Indeed, the program control belt 82 has its program established on this basis, "teaching" the program to the apparatus in the manner described in my application Serial No. 226,203 and my Patent No. 2,988,237, mentioned above.

At the end of the program, sensing element 102 causes a control signal to go both to relay 90 via holding circuit 132 and to relay 144 via capacitor 148. This effects reversal of motor 20 (146a, 146b) to restore apparatus 12 rapidly to its starting position, and it effects return of belt 82 to the "home" position. Forward feed of belt 82 is resumed automatically for advance to the first control position of the program belt 82. During the return travel of apparatus 12, switch 30 is ineffective to respond to incidental reverse cooperation of bar 28 and switch lever 32 because the circuit from switch 30 to the power supply terminal is broken by relay contacts 140a that are open at this time. Return travel of apparatus 12 is terminated by limit switch 150. After belt 82 reaches its "home" position, it is automatically operated a short distance in the forward-feeding direction as a result of closing of contacts 90e and changing flip-flop 94 to its motor-operating condition. When sensing element 98 senses the first control position, belt-feed motor 86 stops.

The propelling drive of unit 12 and the program control means are thus restored to condition for a new cycle of operation under control of the next bar 28 of the conveyor.

The combination-code-to-displacement converter apparatus in FIGURE 4 is of distinctive value as a means for producing program-controlled displacements. Advantageously, the construction may be modified for incorporating contacts 76b operated by electromagnets 66a respectively, so as to make these electromagnets self-holding and thus to eliminate relays 76.

A further contemplated departure from the foregoing appears in FIGURE 5. An L-shaped member 154 is supported on a strong pivot shaft 156 depending from the bottom of apparatus 12. A pair of toggle links 158 and 160 are joined by knee pivot 162. Elements 154 and 158 are connected at pivot 164, while link 160 has one end pivoted to rigid support shaft 166 depending from apparatus 12. Spring 168 urges the toggle links 158 and 160 into their erect condition and projection 170 of link 160 arrests the links in straight-line position against the spring bias.

When bar 28 of conveyor 10 advances against member 154, erect toggle 158, 160 prevents the member 154 from pivoting and consequently bar 28 (powered by conveyor 10) drives member 154 and its supporting apparatus 12 along with it. Suitable shock-absorbing support means may be provided in apparatus 12 for shaft 156, if needed.

When apparatus 12 reaches the limit of its rightward travel, it carries its toggle against stationary pin 172. This initiates buckling of the toggle. Thereafter any pressure by bar 28 is not resisted by member 154, the latter merely dropping out of the path of advance of bar 28. As a result, apparatus 12 stops its movement to the right. It should be understood that in the embodiment of FIGURES 1–4, apparatus 12 is to be equipped with all of the described programming apparatus, including switch 30, 32 for initiating the programmed operation. Replacing or additional to pin 172, an end-of-program electromagnet (not shown) can be arranged to buckle the toggle under control of circuit 132 (FIGURE 3). Motor 20 is to be retained and connected for its reverse-drive function only. Motor 20 may be initiated in operation by a switch assembled adjacent knee 162 and momentarily closed by the toggle to energize relay 144 (FIGURE 3).

In the foregoing description, two forms of coupling have been included for achieving synchronized advance of apparatus 12 together with the workpiece A on the conveyor, one in which a follow-up drive is provided for keeping the programmed apparatus 12 synchronized with the conveyor, and the other (FIGURE 5) in which forward direct drive for apparatus 12 is provided by the conveyor. It is contemplated that substitute controls may be provided for driving apparatus 12 in its forward travel in time with the conveyor 10, using magnetic or photoelectric means on apparatus 12 and cooperating means on conveyor 10. For example, digitally coded patterns may be formed at key locations on the moving conveyor 10, cooperating with magnetic sensing means on the apparatus 12 to replace the mechanical coaction of pin 28 and switch lever 32 and flight 34 shown in FIGURE 1. One form of such photoelectric cooperation is included in the apparatus of FIGURES 7–9.

A modified form of control and drive means is shown in FIGURE 6 to replace the electric motor 20 (146a, 146b) in FIGURES 1 and 3, as well as its drive chain 16. In FIGURE 6, the base 12a of the work device 12 is carried by wheels (not shown) driven by hydraulic motor 210, the wheels operating on the same rails 14 as in FIGURE 1. Motor 210 is controlled by a hydraulic valve 212 having a pressure inlet line 214, two lines 216 to the dump side of a hydraulic pressure system and lines 218 extending to motor 210. The hydraulic pressure-supply system for line 214 is conveniently installed on base 12a so as to travel with motor 210. The body of valve 212 is mounted for limited longitudinal movement relative to base 12a. An arm 220 extends from the valve body between two rods 222 that have heads normally restrained by the ends of cages 224 on base 12a. Springs 226 bias rods 222 to center arm 220.

Valve 212 has a spool 212a that is normally centered to close off lines 218 or to supply balanced pressure to those lines, depending on the form of valve selected. Rod 228 extending from spool 212a has a sleeve end that slidably receives a control bar 230. A pin-and-slot guide 232, 234 enables bar 230 to slide at right angles to rod 228. Bar 230 is biased away from conveyor 10 by spring 236 and an arm 238 on bar 230 is operable toward conveyor 10 by an electromagnet 240. Bar 230 is centered by a rod 242 that is headed and contained in a cage 244, and is biased toward the left by spring 246. A fixed stop 248 extends from the floor that carries rails 14. Stop 248 arrests bar 230. In all positions of base 12a away from stop 248, rod 242 biases bar 230 and valve control rod 228 to the left of the position illustrated. In that condition, valve 212 operates motor 210 to drive base 12a toward stop 248. This return drive of base 12a continues at full speed until stop 248 is engaged, and drive by motor 210 slows down as spool 212a is centered and the drive is stopped.

Conveyor 10 has a pin 28a at each article location of the conveyor, pin 28a having a doubly sloping end that is cooperable with complementary doubly slanted recess 230a in bar 230. Switch 30a on base 12a has an actuating arm 32a in the path of pin 28a, and switch 30a, when closed by pin 28a, energizes relay 140'. Electromagnet 240 is energized by closing of contacts 140b' of relay 140' when the latter is energized upon closure of switch 30a. Consequently, closing of switch 30a by pin 28a results in bar 230 being driven instantly toward pin 28a. Switch actuator 32a is located in relation to bar 230 so that, making any necessary allowance for the speed of the conveyor and the time for actuating bar 230, the recess 230a mates with pin 28a. Relay contacts 140a close when relay 140' is energized, and establish a relay-holding circuit. Relay 140' replaces relay 140 in FIGURE 3.

As a result of the foregoing, when pin 28a operates switch 30a, bar 230 is projected into accurately-determined coaction with pin 28a. Conveyor 10 carries pin 28a to the right, and this moves bar 230 and valve spool 212a to the right, promptly starting motor 210 to drive the base 12a along with the conveyor. The rate of this drive is accurately controlled since any tendency of drive 210 to advance base 12a ahead of the conveyor would correspondingly restore bar 230 and valve spool 212a toward the left, slowing the drive. At equilibrium, the base 12a and the conveyor move in step accurately. During this time the programmed operation of apparatus 12 proceeds, being initiated in operation under control of relay contacts 140d', connected in place of contacts 140d of FIGURE 3.

At the end of the program cycle, the holding circuit of relay 140' is broken as described in connection with FIGURE 3 so that electromagnet 240 is deenergized and spring 236 retracts bar 230 away from pin 28a. Thereupon, spring 246 shifts bar 230 and rod 228 to the left.

Valve 212 operates motor 210 to drive base 12a to the left, continuing until stop 248 causes valve 212 to be centered. The apparatus is thus in readiness for a renewed cycle of operation.

In connection with FIGURES 1–6, it has been tacitly assumed that the work carried by the conveyor or article carrier can be deposited and retained on the conveyor in an accurate position, both laterally in relation to the edge of the belt or disc conveyor and longitudinally relative to the projecting element 28 to which the transport of the programmed apparatus is keyed. Under some conditions, the article might shift on the conveyor in the course of its travel, or the assumed accuracy of positioning of the article relative to the control element 28 on the conveyor may not be practical or feasible. FIGURES 7–9 show a form of apparatus that avoids this difficulty, by providing direct coordination of the programmed apparatus with the material or article carried by the conveyor. The apparatus of FIGURES 7–9 utilizes certain concepts and apparatus additional to that which has already been discussed.

Conveyor 10' and base 12a' of the programmed unit 12' in FIGURES 7–9 correspond to like-numbered parts in FIGURES 1, 3 and 6. Unit 12' is supported on wheels 12b' for rolling on rails 14' along belt conveyor 10'. This apparatus utilizes the control and program circuit of FIGURE 3, modified to utilize the hydraulic drive of FIGURE 6, plus further features to be explained in detail.

Conveyor 10' carries an article A' that is the object of the programmed operations of unit 12', or it may be an article that is fastened to a reusable supporting pallet. Bar 28' projects laterally from the pallet A', and coacts with control devices nearly the same as in FIGURE 6, except that rod 230' has a deeply slotted end portion 230a' to coact with bar 28'. The ends of portion 230a' are oppositely sloped to achieve accurate alignment with bar 28', like the diverging faces of rod portion 230a in FIGURE 6. A switch 30' (FIGURE 9) resembling switch 30 of FIGURE 1 may also be provided on base 12a' for initiating a coordinated sequence of operations of the programmed apparatus and the transport of the unit 12' along its rails 14'. Inasmuch as the article A' and the bar 28' carried thereby may assume various positions laterally, relative to the edges of the conveyor, bar 28' should be long enough to engage the switch lever throughout the range of variation in lateral positioning of the article. Alternatively, switch 30' represents a photocell-actuated switch in base 12a'. A photo-cell may be aimed toward article A' perpendicular of the conveyor edge and a parallel-beam light source also carried by base 12a closely adjacent to the photocell may be aimed at a reflecting spot on the side of article A'. The reflection from the spot on the article will activate the photocell and close the switch. Of course, a light source carried by the article or a glass bead reflector on the article illuminated by ambient light may also be used to operate the photocell.

Switch 30' in FIGURE 9, when closed, energizes relay 140' and closes relay contacts 140a', 140b' and 140d'. Contact 140b' is connected to electromagnet 240' which drives rod 230' into coaction with bar 28', to initiate operation of a hydraulic system for transporting unit 12' along rails 14' as described in connection with FIGURE 6. Switch 30' closes and only momentarily energizes relay 140' by drawing displacement current through capacitor 141'. The resistor 143' shunting capacitor 141' discharges the capacitor when switch 30' opens, but resistor 143' does not draw sufficient current to maintain relay 140' energized.

Relay contacts 140a' establish a holding circuit for relay 140', through limit-switch contacts 142' and relay contacts 144a'. Limit switch 142' is disposed to open when unit 12' has traveled its maximum distance along rails 14', and does not normally open since the holding circuit is normally opened sooner by energization of relay 144'.

Lead 260 connects relay contacts 140b' to solenoids 262 and 264 which shift the control parts 266a and 268a of servo master valves 266 and 268 toward pallet or article A'. The valve-bodies of valves 266 and 268 are fixed to upper base 12c. Valve control parts 266a and 268a project from the front surface of upper base 12c of apparatus 12', at the opposite ends of upper base 12c. The latter is slidably mounted on base 12a' and is guided without angular constraint (over a substantial angular latitude) by guide rollers 12d projecting from base 12a'. Base 12c supports all of the structure and its programmed actuators in the various degrees of freedom in the apparatus 12 of FIGURE 1. A pair of slave hydraulic motors 270 and 272 are fixed to base 12a', operated by master valves 266 and 268. Motors 270 and 272 operate worm gears (not shown) in mesh with worm shafts 270a and 272a. These shafts have flexible connections to the opposite ends of upper base 12c. Solenoids 262 and 264, when energized, operate valve parts 266a and 268a toward article A' and cause motors 270 and 272 to move upper base 12c toward article A'. Additional solenoids 274 and 276 are provided, arranged to move valve control parts 266a and 268a away from article A' when energized, and cause motors 270 and 272 to operate upper base 12c away from article A' and laterally away from conveyor 10'.

Lead 260 is energized upon closing of relay contacts 140b', and this causes motors 270 and 272 to advance upper base 12c toward article A'. Each servo master valve 266 and 268 is individually centered by engagement with article A'. This discontinues advance of each respective end of base 12c toward the article A' and aligns the apparatus with article A'. Control 230a' causes apparatus 12' to be centered opposite article A'. This accurate orientation of apparatus 12' opposite article A' occurs when apparatus 12' starts to move along conveyor 10', and accommodates both lateral and longitudinal adjustments, and angular adjustments too.

Servo valves 266 and 268 have pressure-differential switches 266b and 268b that are connected in series, and are connected by relay contacts 278a between lead 260 and relay 120'. Relay 278 connected to lead 260 has a slow pull-in characteristic and closes contacts 278a after a brief delay following closing of contacts 140b'. This allows time for solenoids 262 and 264 to shift the spools of valves 266 and 268 off-center, thereby to cause contacts 266b and 268b to open after initial closure of relay contacts 140b'. Motors 270 and 272 carry valve actuators 266a and 268a against article A'. This causes recentering of the valve spools of both valves. Switches 266b and 268b then close and energize relay 120'. This relay has contacts 120a' in series with pressure switch 122(1), 122(2), etc. of the various actuators of unit 12, more fully described in connection with FIGURES 1–3.

Reclosing of both switches 266b and 268b occurs at the time when unit 12' has been shifted laterally toward article A', into accurte orientation relative to unit 12'. The start of the programmed operation of unit 12' thus occurs after a delay time following closing of switch 30', this delay providing for initial alignment of unit 12' with article A'. The delay affords the same time interval for start-up of the hydraulic system 230', 212, 210 (FIGURES 6 and 9) that propels unit 12' forward, along and in time with conveyor 10'. The programmed operation of unit 12' commences with closing of contacts 266b and 268b and the resulting energization of relay 120'. Thereafter, apparatus 12' advances with conveyor 10' in accurate orientation wtih article A' while the program of belt 82 (FIGURE 3) is carried out.

As already considered in connection with FIGURE 3, completion of the programmed operation of unit 12' supplies an impulse via capacitor 148'. This capacitor is connected to relay 144'. Energization of this relay closes its holding contacts 144d' in series with limit switch 150', and relay 144' remains energized until the unit 12' has been return-propelled to its starting location. Thereupon switch 150' opens and the relay 144' drops out.

Relay 144' has normally closed contacts 144a' in the holding circuit of relay 140'. Energization of relay 144' deenergizes relay 140' and solenoid 240'. Bar 230' retracts from rod 28' and shifts in the direction to cause the longitudinal propelling hydraulic motor 210 to return base 12a' to its starting position, as explained in connection with FIGURE 6.

When relay contacts 144a' open, relay contacts 144b' close and energize valve-actuating solenoids 274 and 276. This operates valve control members 266a and 268a away from article A' and causes operation of motors 270 and 272 to restore base 12c to its retracted position. As soon as lateral return-travel of upper base 12c is complete, servo-valve control elements 266a and 268a strike respective fixed stops 280 on base 12a', and motors 270 and 272 stop. This completes the lateral return stroke of unit 12'.

When longitudinal return-travel of base 12a' is complete, switch 150' carried by this base strikes a stop and opens. Relay 144' is deenergized. Its holding circuit opens, and the entire unit 12' is ready for a subsequent sequence of operations coordinated with the conveyor.

The apparatus of FIGS. 7–9 provides a time delay following operation of switch 30' (FIG. 9) by an element 28' and until relay 120' is energized. Closing of relay contacts 120a' starts a new program sequence of unit 12', as described previously in connection with FIG. 3. This delay provides time before the program of unit 12' starts, enabling unit 12' to start its travel along conveyor 10' and to become synchronized therewith, for diposing an article A' accurately at a prescribed relatively fixed position opposite the now-traveling unit 12'. Such a delay could be incorporated in the program of belt 82, or it could be achieved otherwise as by interposing a time-delay circuit between relay contacts 140d and the circuit in FIG. 3 controlled by contacts 140d. Synchronous travel of unit 12 or 12' opposite an article A' is sustained throughout the program of belt 82 by any of the various means shown in FIGS. 1 and 2, FIG. 6 or FIGS. 7–9, or by equivalent means. In this connection, it should be noted that, while element 28 is shown physically attached to conveyor 10, element 28 can be operated in coordination with conveyor 10 as by being carried by a timing chain coordinated with the conveyor and operating in synchronism therewith.

It has been stated above that the work device 26 may be an article gripper, and article A or A' may be a pallet that is to be loaded or unloaded while in transit on conveyor 10 or 10'. The objects to be loaded or unloaded can be obtained from a supply or delivered to a receptacle that is appropriately disposed on base 12a or otherwise. Where work unit 26 is a screw or nut applier, it would contain its own supply of screws or nuts.

The terms "longitudinal" and "tranverse" have been used above in connection with a straight-line conveyor 10 and 10', but as already indicated, these terms apply also to corresponding arcuate movements and radial movements of units 12 and 12' where a rotating disc-type article carrier or conveyor is used.

Varied application and modifications of the novel concepts in the apparatus described above will be apparent to those skilled in the art, so that the invention should be construed broadly in accordance with its full spirit and scope.

What is claimed is:

1. In combination, program-controlled apparatus having a main base and including a work device, a conveyor for transporting an article along a path past said program-controlled apparatus, and reciprocable driving means for transporting said base forward along the conveyor to enable the work device to perform prescribed operations on an article while in transit and to return the base to a starting position preparatory to the advance of another article, said program-controlled apparatus including supporting and actuating means for moving said work device in multiple degrees of freedom, program-control means, sensing means cooperating with said program-control means, and control means for said actuating means and for said work device controlled by said sensing means, and coordinating means for initiating operation of said program-controlled apparatus and said base-driving means and said coordinating means including article-position indicating elements movable coordinately with said conveyor and control means for said base-driving means movable coordinately with said program-controlled apparatus and cooperable with said article-position indicating means for maintaining prescribed orientation of said program-controlled apparatus in relation to an article on the conveyor during the program-controlled operation of said apparatus.

2. In combination, program-controlled apparatus having a main base and including a work device, a conveyor for transporting an article along a path past said program-controlled apparatus, and reciprocable driving means for transporting said base forward along the conveyor to enable the work device to perform prescribed operations on an article while in transit and to return the base to a starting position preparatory to the advance of another article, said program-controlled apparatus including supporting and actuating means for moving said work device in multiple degrees of freedom, program-control means, sensing means cooperating with said program-control means, and control means for said actuating means and for said work device controlled by said sensing means, and coordinating means for initiating operation of said program-controlled apparatus and said base-driving means, said coordinating means including article-position indicating means movable coordinately with an article on the conveyor and an operation-initiating control device responsive to said article-position indicating means to initiate operation of said coordinating means and said reciprocable driving means including control means movable coordinately with said program-controlled apparatus and cooperable with said article-position indicating means for maintaining prescribed orientation of said program-controlled apparatus with an article on the conveyor during the forward transport of said base along the conveyor.

3. In combination, program-controlled apparatus having a main base and including a work device, a conveyor for transporting an article along a path past said program-controlled apparatus, and reciprocable driving means for transporting said base forward along the conveyor to enable the work device to perform prescribed operations on an article while in transit and to return the base to a starting position preparatory to the advance of another article, said program-controlled apparatus including supporting and actuating means for moving said work device in multiple degrees of freedom, program-control means, sensing means cooperating with said program-control means, and control means for said actuating means and for said work device controlled by said sensing means, and coordinating means for initiating forward operation of said driving means and maintaining synchronized speed of the base with the conveyor and for maintaining prescribed location of the base relative to an article on the conveyor, said coordinating means including article-position indicating means movable coordinately with the conveyor and a master servo control for said driving means cooperable with said article-position indicating means.

4. The combination in accordance with claim 3, wherein said article-position indicating means comprises a first member and wherein said master servo control includes a companion member, said coordinating means including means for maintaining said members locked together during said forward operation, and for releasing said members following execution of the program of said program control means.

5. In combination, program-controlled apparatus having a main base and including a work device, a conveyor for transporting an article along a path past said program-controlled apparatus, and reciprocable driving means for transporting said base forward along the conveyor to enable the work device to perform prescribed operations on an article while in transit and to return the base to a starting position preparatory to the advance of another article, said program-controlled apparatus including supporting and actuating means for moving said work device in multiple degrees of freedom, program-control means, sensing means cooperating with said program-control means, and control means for said actuating means and for said work device controlled by said sensing means, an upper base supporting said program-controlled apparatus and supported by said main base, article-responsive drive means acting between said upper base and said main base for moving the program-controlled apparatus transverse to said article path, article-position indicating means movable coordinately with an article on the conveyor, and coordinating means responsive to said article-position indicating means for initiating operation of said drive means to move said program-controlled apparatus into prescribed lateral orientation relative to an article on the conveyor, said coordinating means further including means for initiating forward operation of said reciprocable driving means into synchronized travel with the conveyor and for initiating operation of said program-controlled apparatus.

6. In combination, a power-driven conveyor and program-controlled apparatus having a work device and having a base mounted for movement along said conveyor, said program-controlled apparatus including supporting and actuating means for moving said work device in multiple degrees of freedom, and programmed control means for said actuating means and for said work device, and driving means including sensing and control means movable coordinately with said program-controlled apparatus along the conveyor and cooperable with means carried by the conveyor for fixing said program-controlled apparatus in predetermined orientation in relation to an article carried by said conveyor during the execution of the program of said programmed control means.

7. Apparatus in accordance with claim 6, wherein said sensing and control means includes means cooperable with a discrete portion of an article on which said work device is to operate for controlling lengthwise operation of a portion of said driving means and wherein said sensing and control means includes portions spaced apart along the article and laterally cooperable therewith for separately controlling portions of said driving means for laterally and angularly adjusting said program-controlled apparatus into prescribed orientation relative to an article on the conveyor.

8. Apparatus in accordance with claim 6 wherein said sensing and control means includes an element cooperable with a discrete element identified with the longitudinal position of an article on the conveyor for controlling a portion of said driving means in establishing longitudinal positioning and synchronium of said program-controlled apparatus in relation to the article on which the work device is to operate, said sensing and control means also including an element cooperable laterally with such article for controlling a lateral-drive portion of said driving means for adjusting said program-controlled apparatus into a predetermined relative position laterally of such articles.

9. Apparatus in accordance with claim 6, further including sensing means responsive to the attainment of the desired orientation of the program-controlled apparatus in relation to the article on which the work device is to operate, said responsive means being connected in control relation to said program-controlled apparatus for starting an operation thereof.

10. In combination, a power-driven conveyor and program-controlled apparatus having a work device and having a base mounted for movement along said conveyor, said program-controlled apparatus including supporting and actuating means for moving said work device in multiple degrees of freedom, and programmed control means for said actuating means and for said work device, drive means for propelling said base reversibly along said conveyor, a speed-control device for said base drive means carried by said apparatus, a detector responsive to a discrete element identified with an article on which the work device is to operate, and means controlled by said detector for establishing fixed orientation of said speed control device with an element fixed in relation to such article, said speed control device being arranged to accelerate and to decelerate said driving means so as to attain and maintain synchronous advance of said base with said conveyor.

11. Apparatus in accordance with claim 10, including means for releasing said speed-control device after the program of said program-controlled apparatus is complete, means responsive to release of said speed-control device for reversing said drive means, and limit-stop control means for said drive means to arrest the program controlled apparatus in its initial position.

12. In combination, a power-driven conveyor and program-controlled apparatus having a work device and having a base mounted for movement along said conveyor, said program-controlled apparatus including supporting and actuating means for moving said work device in multiple degrees of freedom, and programmed control means for said actuating means and for said work device, and drive means for advancing said base in synchronism with said conveyor and in prescribed orientation with an object on which the work device is to operate, said drive means including a driving device and a pusher operated by said driving device against an object-position indicating element moved in coordination with said conveyor in fixed relation to such object, thereby limiting the speed of the driving device, and a direct driving connection from said pusher to said base for advancing said base in fixed relation to said object-position indicating element.

13. Apparatus in accordance with claim 12, further including control means operable after completion of the program of said program-controlled apparatus for restoring said base to a starting position.

14. Apparatus in accordance with claim 12, including control means coordinated with the start of said drive means for initiating operation of said program-controlled apparatus and including means responsive to completion of the program thereof for withdrawing said pusher and reversing said drive means to restore the program-controlled apparatus to its starting location.

15. Programmed apparatus including a base, a work device, program-controlled means carried by the base for operating the work device through prescribed motions in multiple degrees of freedom to various positions at which the work device is to perform, said program-controlled means further including a program control record, program-record operating means, sensing means cooperating with said record and control means responsive to said sensing means for coordinating and controlling said operating means and said work device, drive means operatively connected to said base for transporting the base through a prescribed path, and means operatively connected to said program-controlled means and movable therewith by said drive means and responsive to a control element fixed in relation to an article on which said work device is to perform for initiating a programmed cycle of motions and operations of said work device relative to said article and for maintaining prescribed orientation of the program-controlled apparatus relative to such article during travel of said base along said path.

16. In combination, a power-driven conveyor for transporting a succession of articles and having a series of article-position representing parts thereon, and program-controlled apparatus having a work device movable along said conveyor and operable on said articles successively, said program-controlled apparatus including supporting and actuating means for moving said work device in multiple degrees of freedom, and programmed control means for said actuating means, said apparatus having a part engageable with said article-position representing parts, individually, to couple said program-controlled apparatus to said conveyor mechanically for effecting synchronized travel therewith and with prescribed orientation of the apparatus relative to the successive articles on the conveyor, said apparatus having drive means operable after completion of the program of the programmed control means to effect reverse travel of said program-controlled apparatus to a starting position.

17. The combination in accordance with claim 16, including means operable to release the engagement of said engageable parts after completion of the program of said programmed control means and prior to said reverse travel of the program-controlled apparatus.

18. The combination in accordance with claim 17, including means controlled by said program-controlled apparatus for effecting release of said engageable parts.

19. The combination in accordance with claim 17, including means operable after travel of said base to a predetermined point for releasing said engageable parts.

20. In combination, a conveyor for transporting a succession of articles along a prescribed path, and program-controlled apparatus having a work device operable on said articles and including means for supporting and operating said work device in multiple degrees of freedom including a motion along the conveyor and reversely, said program-controlled apparatus including program-control means and sensing means cooperable therewith for controlling portions of said operating means to effect prescribed operations of the work device, and coordinating means including article-position indicating means movable coordinately with the conveyor and drive control means cooperable with said article-position means and movable coordinately with a portion of said operating means for adding to said prescribed operations of said work device a motion along the conveyor at a speed synchronized with the speed of the conveyor and with prescribed orientation relative to each article carried thereby, said apparatus having drive means to effect reverse travel of the program-controlled apparatus to a starting position after completion of the program.

21. The combination in accordance with claim 20 wherein said article-position indicating means comprises a succession of mechanical elements carried by the conveyor and said drive control means includes an element mechanically cooperable with one of said mechanical elements during a coordinated motion of the conveyor and the work device as aforesaid, said portion of the operating means tending to advance the work device along the conveyor at a speed slightly different from the conveyor speed, said element and one of said mechanical elements cooperating therewith enforcing said synchronized speed of the program-controlled apparatus along the conveyor and enforcing said prescribed orientation.

22. The combination in accordance with claim 21 wherein the speed of said work-device advancing means tends to be faster than that of the conveyor and is retarded when one of said mechanical elements is interposed in the advancing path of said mechanically cooperable element.

23. The combination in accordance with claim 21 wherein one of said succession of mechanical elements and the element cooperable therewith form part of a mechanical connection between said conveyor and said programmed apparatus, said mechanical connection having provision for lost motion for accommodating initial acceleration of the program-controlled apparatus from rest and until said synchronized speed and said orientation are attained.

24. The combination in accordance with claim 20, wherein said coordinating means includes drive starting means for accelerating said apparatus from a stationary position, and wherein said article-position indicating means and said drive control means include mechanically cooperable parts on said conveyor and on said program-controlled apparatus, respectively, said mechanically cooperable parts forming part of a lost-motion coordinating coupling between said conveyor and said apparatus for accommodating at the start of motion of said apparatus along the conveyor a departure of said program-controlled apparatus from said synchronized speed and from said prescribed orientation.

25. The combination in accordance with claim 20, wherein said drive means and said coordinating means include means for accelerating said work device from rest to said synchronized speed and into said prescribed orientation.

26. The combination in accordance with claim 20, wherein said drive means and said coordinating means include a servo system having a servo master control and a servo slave actuator, said master control being operable as a result of the initial cooperation of said drive control means with one of said article-position indicating means to accelerate the work device from a stationary position to said synchronized speed and into said prescribed orientation.

27. In combination, a power-driven conveyor for transporting a succession of articles and having a series of article-position representing devices movable coordinately therewith, and program-controlled apparatus having a work device operable on said articles successively, said program-controlled apparatus including supporting means for movement of said work device in multiple degrees of freedom, actuating means for said supporting means, and programmed control means for effecting prescribed motions of said work device by said actuating means, and further control means for said actuating means responsive to said series of article-position representing devices, successively, for initiating accelerated advance of at least part of said supporting means along the conveyor, said further control means including a part movable in coordination with said part of said supporting means for thereafter imparting to the work device a synchronized speed along the conveyor and effecting prescribed orientation thereof relative to the conveyor, additional to any motions of the work device resulting from operation of said programmed control means.

References Cited by the Examiner

UNITED STATES PATENTS

| | | | |
|---|---|---|---|
| 2,163,967 | 6/1939 | Strawn | 83—292 |
| 2,712,101 | 6/1955 | Salati | 317—137 |
| 2,834,156 | 5/1958 | Oberlin | 83—297 X |
| 2,933,025 | 4/1960 | MacDonald | 214—1 |
| 2,974,260 | 3/1961 | Stimler | 317—137 |
| 3,095,982 | 7/1963 | Weiser | 214—1 |
| 3,132,290 | 5/1964 | Kumpf | 317—123 |
| 3,168,184 | 2/1965 | Galvin | 214—1 X |

FOREIGN PATENTS 781,465   8/1957   Great Britain.

MARVIN A. CHAMPION, *Primary Examiner.*